United States Patent

Minkkinen

[11] Patent Number: 5,949,661
[45] Date of Patent: Sep. 7, 1999

[54] SIMPLE CURRENT LIMITING COUPLING FOR REGULATING THE OUTPUT CURRENT OF A POWER SUPPLY

[75] Inventor: Jarmo Minkkinen, Pertteli, Finland

[73] Assignee: Nokia Technology GmbH, Pforzheim, Germany

[21] Appl. No.: 09/004,112

[22] Filed: Jan. 7, 1998

[30] Foreign Application Priority Data

Jan. 7, 1997 [FI] Finland .................................. 970062

[51] Int. Cl.$^6$ .......................... H02M 3/335; H02H 7/122
[52] U.S. Cl. ................................ 363/21; 363/56; 323/902
[58] Field of Search .......................... 363/21, 56; 323/902

[56] References Cited

U.S. PATENT DOCUMENTS

| | | | |
|---|---|---|---|
| 4,378,585 | 3/1983 | Bete ........................................ | 323/902 |
| 4,383,212 | 5/1983 | Ballman .................................. | 323/902 |
| 4,410,934 | 10/1983 | Fathauer et al. .......................... | 363/21 |
| 4,849,869 | 7/1989 | Tanuma et al. ........................... | 363/21 |
| 5,235,505 | 8/1993 | Hiruma .................................... | 363/56 |
| 5,515,263 | 5/1996 | Otake et al. .............................. | 363/97 |

OTHER PUBLICATIONS

"The Art of Electronics" Horowitz et al, 2nd ed. ISBN 0–521–37095–7, Cambridge University Press, New York, USA, 1989, pp. 355–368.

*Primary Examiner*—Peter S. Wong
*Assistant Examiner*—Bao Q. Vu
*Attorney, Agent, or Firm*—Ware, Fressola, Van Der Sluys & Adolphson LLP

[57] ABSTRACT

An output current limiting coupling for a switched-mode power supply is arranged to produce a feedback signal on the basis of the output current of the switched-mode power supply and to transmit it from the secondary side of the switched-mode power supply to its primary side by means of an opto-isolator (3). The coupling may include the following parts implemented with passive components: a bias voltage coupling (25, 26, 27, 28; 30, 31, 32, 33; 42, 43, 44, 45, 46) for forming a certain first potential to the first electrode of the light-emitting diode (3a) contained in the opto-isolator, and an input coupling (24) for producing a second potential formed on the basis of the output current to the second electrode of the light-emitting diode contained in the opto-isolator. The coupling is suitable for switched-mode power supplies regardless of whether the lighting of the light-emitting diode of the opto-isolator indicates a low or high value of the output current.

7 Claims, 2 Drawing Sheets

SIMPLE CURRENT LIMITING COUPLING FOR REGULATING THE OUTPUT CURRENT OF A POWER SUPPLY

TECHNICAL FIELD

The invention relates to controlling the output properties of an electric power supply. In particular, the invention relates to limiting the output current in a manner which is simple in construction and economical with regard to manufacturing costs.

BACKGROUND OF THE INVENTION

Switched-mode power supplies are generally used in applications in which there is a need for an accurate and versatile control of the output voltage and current of a device producing direct voltage. The principle of a switched-mode power supply is to feed electric power by pulses to an inductive component, which has an energy-storing magnetic field. By means of a suitable discharge coupling, the stored energy is discharged into an output voltage and current, the values of which can be regulated by changing the properties of the input by pulses. Many methods of regulation are known, and among the most common of them is a method in which the output voltage and/or current is measured and a feedback signal indicating the measurement result is transmitted to a circuit which produces the switching pulses regulating the operation of the switching transistor.

FIG. 1 shows a simplified prior art flyback-type switched-mode power supply 1 with a two-coil transformer 2 for transmitting the electric power from the primary side to the secondary side and an opto-isolator 3 for transmitting the feedback signal from the secondary side to the primary side. The electric power comes to the primary side from the AC power supply 4 via a rectifier 5. A capacitor 6 reduces the disturbances of the rectified input voltage and prevents the high-frequency disturbances created by the switched-mode power supply from proceeding towards the AC power supply. The PWM (Pulse Width Modulation) controller 7 gives switching pulses to the base of the switching transistor 8, whereby the primary current runs through the primary coil 2a during each switching pulse. On the secondary side, the diode 9 and the capacitor 10 produce direct voltage to the output line 11 from the electric power transferred to the secondary coil 2b with the known flyback principle (see e.g. Horowitz P., Hill W.: "The Art of Electronics", 2nd ed. ISBN 0-521-37095-7, Cambridge University Press, New York, USA, 1989, p. 355–368).

On the secondary side, an operation amplifier 12 compares the portion of the output voltage produced by the voltage division coupling 13 with the voltage produced by the reference voltage generator 14. If the output voltage rises too high, the signal produced by the operation amplifier 12 lights the light-emitting diode of the opto-isolator 3, whereby the transistor which is the other component of the opto-isolator starts to conduct. Thus the simplified control principle of the switched-mode power supply 1 is that the primary side feeds a certain maximum amount of electric power to the transformer, until it receives from the secondary side a signal indicating that the output voltage is rising too high, whereby the primary side starts to reduce the input of electric power. Often the switched-mode power supply also includes a power limiting coupling, whereby too high a value of the output current causes a signal which is transmitted via the opto-isolator 3 or another signal isolator beside it to the primary side, where it limits the average electric power to be fed to the transformer. One known output limiting coupling comprises a series resistor on the output current path, in which resistor the voltage loss is equal to the product of the resistance of the series resistor and the output current. The voltage loss in question is measured by an operation amplifier, which gives a control signal to the primary side generally in the same manner through the opto-isolator as the operation amplifier 12 which measures the output voltage in the switching shown in FIG. 1.

SUMMARY OF THE INVENTION

Because switched-mode power supplies are becoming increasingly common and they are being integrated into devices in everyday use and even into disposable devices, the objective of their design is structural simplicity and thereby a small size and low manufacturing costs. The purpose of this invention is to present an output current limiting coupling, which has a simple construction and low manufacturing costs. It is also an objective of the invention to present an output current limiting coupling which can be applied to many methods of transmitting the control signal from the secondary side of the switched-mode power supply to the primary side.

The objectives of the invention are achieved by switching the light-emitting diode of the opto-isolator used to transmit the control signal parallelly with the current measurement resistor, whereby the amount of the voltage loss over the current measurement resistor directly controls the current flowing through the light-emitting diode of the opto-isolator.

The switching according to the invention is characterized in that it comprises the following couplings which consist of passive components:
 a bias voltage coupling for forming a certain first potential for the first electrode of the light-emitting diode contained in the opto-isolator, and
 an input coupling for forming a second potential formed on the basis of the output current to the second electrode of the light-emitting diode contained in the opto-isolator.

In the switching according to the invention, the output current path of the secondary side of the switched-mode power supply contains a current measurement resistor, in which the voltage loss is in a known manner proportional to the amount of the output current. If the traditional method described above is used in transmitting the feedback information from the secondary side to the primary side, the voltage loss seen over the current measurement resistor or a portion of it separated by a suitable voltage division coupling operates as the input voltage of the light-emitting diode of the opto-isolator, or the light-emitting diode is brighter when the voltage loss in the current measurement resistor is greater. The meaning of the feedback information can also be opposite to the prior art, whereby the lighting of the light-emitting diode of the opto-isolator corresponds to the instruction given to the primary side to feed more power to the transformer, and the dimming or blanking of the light-emitting diode means that the power input must be reduced. In a switched-mode power supply like this, the solution according to the invention means that the light-emitting diode of the opto-isolator is connected parallelly with the current measurement resistor so that when the voltage loss caused by the current measurement resistor increases, the input voltage seen by the light-emitting diode decreases.

BRIEF DESCRIPTION OF THE DRAWINGS

In the following, the invention will be described in more detail with reference to the preferred embodiments described by way of example, and to the accompanying drawings, in which.

BEST MODE FOR CARRYING OUT THE INVENTION

Figure 1:
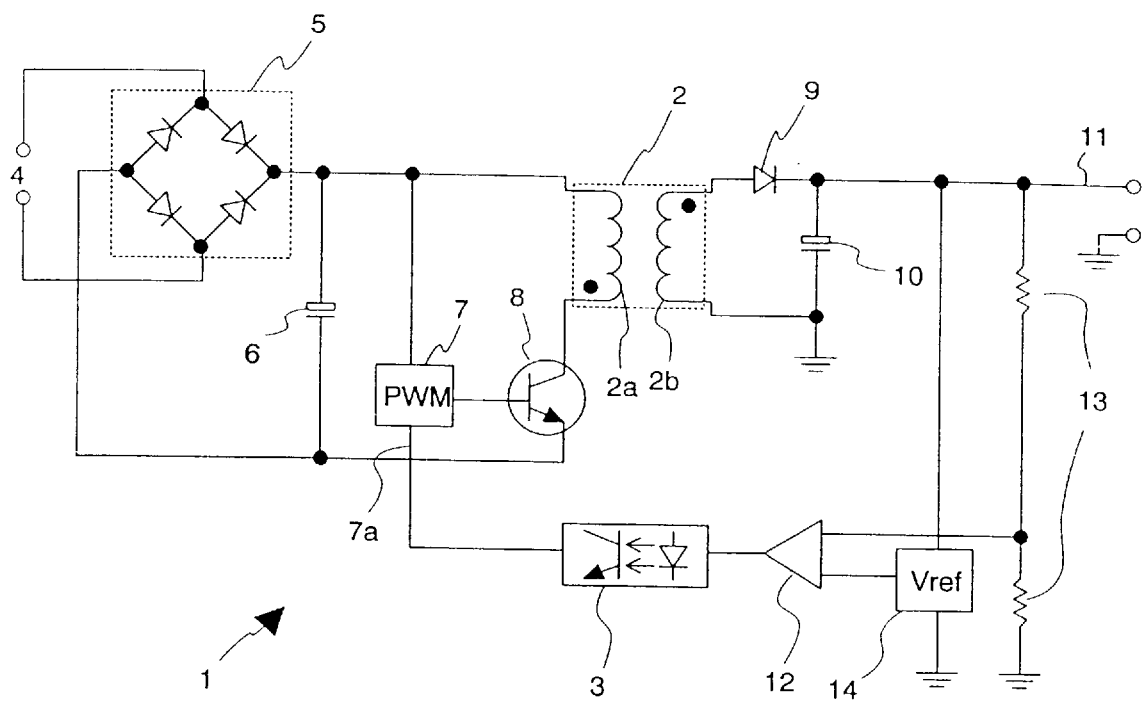
FIG. 1 shows a circuit diagram of a prior art switched-mode power supply.

In the above description of the prior art, reference was made to FIG. 1, and thus in the following description of the invention and its preferred embodiments, reference will be made mostly to FIGS. 2 to 4. The same reference numbers are used in the figures for corresponding parts.

Figure 2:
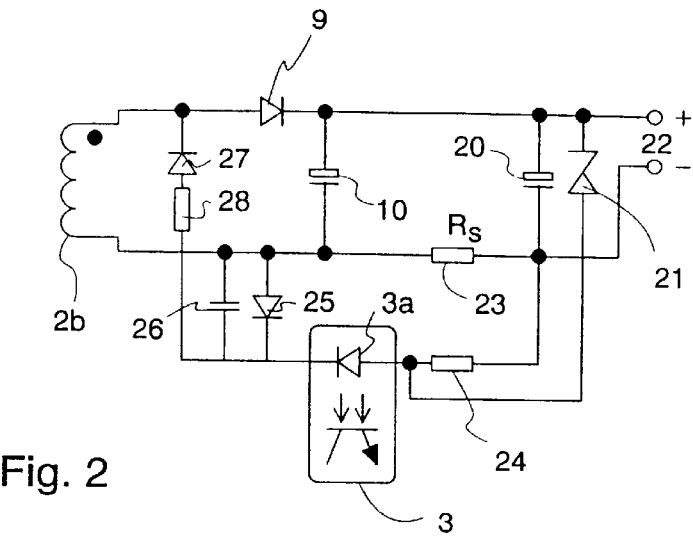
FIG. 2 shows a partial circuit diagram of a switched-mode power supply according to an embodiment of the invention.

The circuit diagram of FIG. 2 shows the parts of the secondary side of the switched-mode power supply which are significant with regard to the invention and/or its understanding. It can be assumed that in the switched-mode power supply shown by the figure, the primary side is like in FIG. 1 or like any other primary switching of a switched-mode power supply known per se, the control of which complies with the principle mentioned above in connection with the description of the prior art: the brighter the light-emitting diode 3a of the opto-isolator 3 is, the less electric power the primary side feeds to the transformer that separates the primary and secondary side. The secondary coil 2b of the transformer, the diode 9 and the capacitor 10 produce the secondary voltage as described above. The capacitor 20 still evens out the momentary variations of the output voltage. In the circuit diagram of FIG. 2, the secondary side has not been presented as earthed like in FIG. 1, but a separate galvanic connection has been drawn from the negative terminal (−) of the output voltage connection 22 via the current measurement resistor 23 to the negative terminal of the circuit 2b, 9, 10, producing the secondary voltage.

In the embodiment shown in FIG. 2, the current limiting coupling according to the invention consists of a current path, which contains as connected in series a resistor 24, a light-emitting diode 3a of the opto-isolator, a resistor 28 and a diode 27. The resistor 24 is connected between the negative terminal of the output voltage connection 22 and the anode of the light-emitting diode 3a of the opto-isolator, the resistor 28 is connected between the cathode of the LED 3a of the opto-isolator and the anode of the diode 27, and the cathode of the diode 27 is connected to the anode of the secondary diode 9. A capacitor 26 is between the cathode of the LED 3a of the opto-isolator and the negative terminal of the secondary coil 2b. The circuit also comprises a diode 25, the cathode of which is connected to the cathode of the LED 3a of the opto-isolator, and the anode is connected to the negative terminal of the secondary coil 2b, and a zener diode 21, the anode of which is connected to the anode of the LED 3a of the opto-isolator, and the cathode is connected to the positive terminal of the output voltage connection 22.

The operation of the circuit shown in FIG. 2 is based on the fact that the potential difference formed by the output current running through the current measurement resistor 23 increased by the negative bias voltage produced by the diodes 25 and 27, the resistor 28 and the capacitor 26 functions as the input voltage of the light-emitting diode 3a of the opto-isolator. By the selection of the current measurement resistor 23, the current path is dimensioned so that when the output current of the power supply increases, the voltage loss over the current measurement resistor 23 rises higher than the combined threshold voltage of the diodes 3a and 25 (where the threshold voltage of the diode 25 is negative), and when the current runs through the LED 3a of the opto-isolator it lights and gives a limiting signal to the primary side of the power supply. The diode 25 stabilizes the negative bias voltage to the value determined by its threshold voltage. At the same time, it performs a simple temperature compensation, because the change of the threshold voltage of the diodes caused by the changes of temperature influences the operation of the circuit through the diodes 3a and 25 with an equally high effect but of the opposite sign. The zener diode 21 operates as a limiter to the output voltage, because the potential difference of the output voltage connection is at the most equally high as the combined threshold voltage of the LED 3a of the opto-isolator and the diode 25 (the latter as negative), increased by the opposite threshold voltage of the zener diode 21.

The circuit according to FIG. 2 has the disadvantage that if a laser-trimmable resistor known per se is used as the current measurement resistor 23, trimming is possible in one direction only (the trimming of laser-trimmable resistors is done by increasing their resistance). FIG. 3 shows an improved embodiment of the invention, in which the following parts operate in an entirely similar manner as above: secondary coil 2b, secondary diode 9, capacitors 10 and 20, zener diode 21, output voltage connection 22, current measurement resistor 23, opto-isolator 3 and its LED 3a, a bias resistor 24 of the current limiting coupling and a capacitor 26, diode 27 and resistor 28. The series-connected resistors 32 and 33 form a voltage division coupling over the negative bias voltage stabilized by the diodes 31 and 32. The cathode of the LED 3a of the opto-isolator is connected to the division point of this voltage division coupling, or between the resistors 32 and 33. The series-connected diodes 30 and 31 form a clamp coupling beside the above mentioned voltage division coupling 32, 33, whereby they limit the potential difference between the ends of the voltage division coupling at the most as high as the combined threshold voltage of the diodes 30 and 31. At the same time, they carry out the temperature compensation in a similar manner as the diode 25 in FIG. 2.

Figure 3:
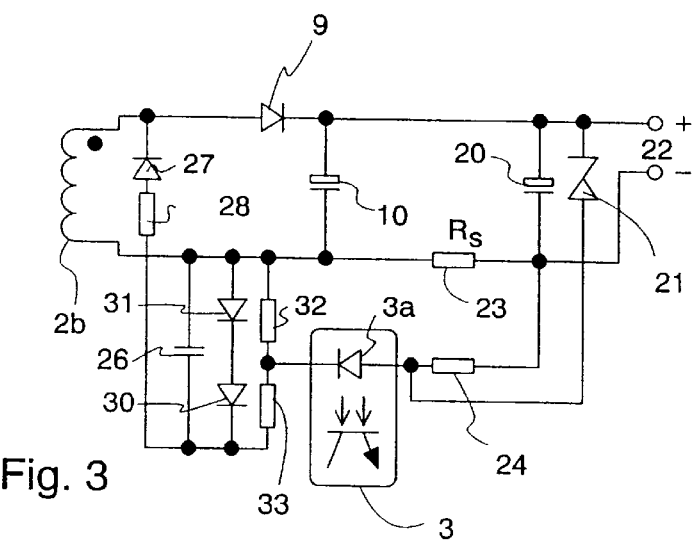
FIG. 3 shows an improved version of a circuit diagram according to FIG. 2.

In the embodiment of FIG. 3, the voltage division coupling 32, 33 forms a negative bias voltage to the cathode of the LED 3a of the opto-isolator, the amount of which bias voltage depends on the mutual relation of the resistances of the resistors 32 and 33. If both resistors 32 and 33 are of the laser-trimmable type, the operation of the current limiting coupling can be trimmed in two directions: increasing the resistance of the resistor 33 decreases the negative bias voltage of the cathode of the LED 3a of the opto-isolator, and correspondingly increasing the resistance of the resistor 32 increases it. The size of the negative bias voltage affects the sensitivity of the current limiting coupling in a known manner, that is, how high the output current should be in order that the current limiting would function.

Figure 4:
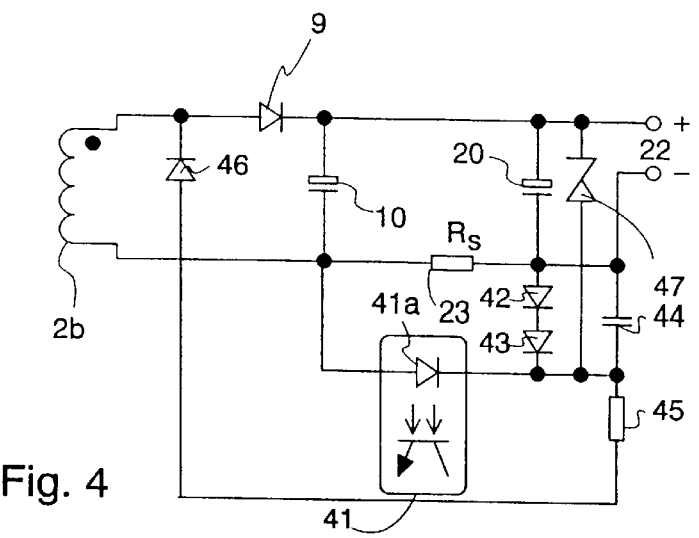
FIG. 4 shows a partial circuit diagram of a switched-mode power supply according to another embodiment of the invention.

FIG. 4 shows the essential parts of the secondary side in a switched-mode power supply in which the above mentioned new control method is used. Components that operate in the same manner as in the embodiments described above are: secondary coil 2b, secondary diode 9, capacitors 10 and 20, output voltage connection 22 and current measurement resistor 23. The anode of the LED 41a of the opto-isolator 41 is connected between the current measurement resistor 23 and the negative terminal of the secondary coil 2b, whereby the actual current path lighting the LED runs through the LED and the series connection switched to its cathode, which series connection comprises a resistor 45 and a diode 46, the coupling order of which corresponds to the coupling order of the resistor 28 and the diode 27 in FIG. 2. The capacitor 44 corresponds to the capacitor 26 presented above, but in this embodiment it is connected between the cathode of the LED 41*a* of the opto-isolator and the negative terminal of the output voltage connection 22. A clamp coupling formed by two sequential diodes 42 and 43 is connected parallelly with it, in which clamp coupling the anode of the diode 42 is connected to the negative terminal of the output voltage coupling 22, and the cathode of the diode 43 is connected to the cathode of the LED 41*a* of the opto-isolator. The zener diode 47 is connected from its anode to the cathode of the LED 41*a* of the opto-isolator, and from its cathode to the positive terminal of the output voltage connection 22.

The operation of a circuit according to FIG. 4 is based on the fact that when the output current is low, the negative bias voltage formed by the diode 46, the resistor 45 and the capacitor 44 at the cathode of the LED 3*a* of the opto-isolator makes the LED light up. When the output current increases, the potential difference over the current measurement resistor 23 draws the anode of the LED 41*a* of the opto-isolator to a more negative potential, whereby the current running through the LED decreases and the brightness of the LED decreases. The clamp coupling formed by the diodes 42 and 43 limits the potential difference between the cathode of the LED 41*a* of the opto-isolator and the negative terminal of the output voltage connection to at the most the size of the combined threshold voltage of the diodes. At the same time, the diodes 42 and 43 form the temperature compensation. The zener diode 47 for its part limits the potential difference of the output voltage connection to at the most the size of the opposite threshold voltage of the zener diode 47, increased by the threshold voltage of the LED 41*a*. In this case, the regulation of the current limiting coupling takes place by trimming the current measurement resistor 23.

The output voltage limiting coupling according to the invention simplifies the construction of the secondary side of the power supply as compared to the prior art solutions, because a separate amplifier connection is not needed to control the opto-isolator. The coupling according to the invention consists of a small number of ordinary passive components, whereby its manufacturing as part of the power supply is economical, and it can be implemented in a very small space. The coupling according to the invention also has a very good operational reliability. The trimmability ensures the correct functioning of the coupling, even if there is variation among the properties of the components. It is clear to a person skilled in the art that the detailed embodiments above have been presented by way of example: the topology of the circuits can be changed without their operation departing from the scope defined by the attached claims.

I claim:

1. A coupling for limiting a power supply output current of a switched-mode power supply, for providing in response to the power supply output current a feedback signal from a secondary side to a primary side of the switched-mode power supply via an opto-isolator (3) having a light-emitting diode (3*a*) with a first electrode and a second electrode, the coupling comprising:

a voltage limiting element (21) on the secondary side responsive to an output voltage for limiting the output voltage and for limiting a voltage to the second electrode of the light emitting diode (3*a*);

a bias voltage coupling (25, 26, 27, 28; 26, 30, 31, 32, 33), responsive to a current signal from a current measurement resistor (23) on the secondary side, for providing a first voltage potential to the first electrode of the light-emitting diode (3*a*) of the opto-isolator (3) and for limiting the current in the light emitting diode (3*a*);

an input coupling (24), responsive to the current signal from the current measurement resistor (23), for providing a second potential formed on the basis of an output current to the second electrode of the light-emitting diode (3*a*) of the opto-isolator (3) and for limiting the current in the light emitting diode (3*a*);

the light-emitting diode (3*a*) of the opto-isolator (3) providing light as an indication of a high value of the output current;

the coupling being part of the secondary side of the switched-mode power supply, and having in a series connection the current measurement resistor (23), a secondary coil (2*b*) and a rectifier diode (9);

the bias voltage coupling (25, 26, 27, 28; 26, 30, 31, 32, 33) being connected to a terminal of the secondary coil (2*b*) which connects to the rectifier diode (9) and is also connected to a first end of the current measurement resistor (23); and the input coupling (24) being connected to a second end of the current measurement resistor (23);

characterized in that said bias voltage coupling (25, 26, 27, 28; 26, 30, 31, 32, 33) comprises:

between a cathode of the light-emitting diode (3*a*) of the opto-isolator (3) and the terminal of the secondary coil (2*b*), a first diode (27) and a resistor (28) arranged in a series connections; and between a point between the cathode of the light-emitting diode (3*a*) of the opto-isolator (3) and said resistor (28) and a point between the secondary coil (2*b*) and the current measurement resistor (23), a second diode (25; 30) and a capacitor (26) connected in parallel, the cathode of said second diode (25; 30) being connected to a point between the cathode of the light-emitting diode (3*a*) of the opto-isolator (3) and said resistor (28).

2. A coupling according to claim 1, characterized in that said current measurement resistor (23) is a trimmable resistor.

3. A coupling for limiting a power supply output current of a switched-mode power supply, for providing in response to the power supply output current a feedback signal from a secondary side to a primary side of the switched-mode power supply via an opto-isolator (3) having a light-emitting diode (3*a*) with a first electrode and a second electrode, the coupling comprising:

voltage limiting element (21) on the secondary side responsive to an output voltage for limiting the output voltage and for limiting a voltage to the second electrode of the light emitting diode (3*a*);

a bias voltage coupling (26, 27, 28, 30, 31, 32, 33), responsive to a current signal from a current measurement resistor (23) on the secondary side, for providing a first voltage potential to the first electrode of the light-emitting diode (3*a*) of the opto-isolator (3) and for limiting the current in the light emitting diode (3*a*);

an input coupling responsive to the current signal from the current measurement resistor (23), for providing a second potential formed on the basis of an output current to the second electrode of the light-emitting diode (3*a*) of the opto-isolator (3) and for limiting the current in the light emitting diode (3*a*);

the light-emitting diode (3*a*) of the opto-isolator (3) providing light as an indication of a high value of the output current;

the coupling being part of the secondary side of the switched-mode power supply, and having in a series connection the current measurement resistor (23), a secondary coil (2*b*) and a rectifier diode (9);

the bias voltage coupling (26, 27, 28, 30, 31, 32, 33) being connected to a terminal of the secondary coil (2*b*) which connects to the rectifier diode (9) and is also connected to a first end of the current measurement resistor (23); and the input coupling (24) being connected to a second end of the current measurement resistor (23);

characterized in that said bias voltage coup;ling (26, 27, 28, 30, 31, 32, 33) comprises:

a series connection consisting of a first diode (27) and a resistor (28) and connected to the secondary coil (2*b*), in which connection the anode of the first diode (27) is connected to the secondary coil (2*b*) and the resistor (28) is connected to the cathode of the first diode (27), and between the resistor (28) end of the series connection and a point between the secondary coil (2*b*) and the current measurement resistor (23), connected in parallel:

a capacitor (26), connected in series and with similar orientation, a second diode (31) and a third diode (30), in which the anode of the second diode (31) is connected to a point between the secondary coil (2*b*) and the current measurement resistor (23), and the cathode of the third diode (30) is connected to an end of the resistor (28) in the series connection, and in a series connection, a second resistor (32) and a third resistor (33), which form a voltage division coupling, whereby the cathode of the light-emitting diode (3*a*) of the opto-isolator (3) is connected to a point between the second resistor (32) and the third resistor (33).

4. A coupling according to claim 3, characterized in that the second resistor (32) and the third resistor (33) are trimmable resistors.

5. A coupling for limiting a power supply output current of a switched-mode power supply, for providing in response to the power supply output current a feedback signal from a secondary side to a primary side of the switched-mode power supply via an opto-isolator having a light-emitting diode with a first electrode and a second electrode, the coupling comprising:

a voltage limiting element on the secondary side responsive to an output voltage for limiting the output voltage and for limiting a voltage to the second electrode of the light emitting diode;

a bias voltage coupling, responsive to a current signal from a current measurement resistor on the secondary side, for providing a first voltage potential to the first electrode of the light-emitting diode of the opto-isolator and for limiting the current in the light emitting diode;

an input coupling, responsive to the current signal from the current measurement resistor, for providing a second potential formed on the basis of an output current to the second electrode of the light-emitting diode of the opto-isolator and for limiting the current in the light emitting diode;

characterized in that the bias voltage coupling and the input coupling are arranged so that the light-emitting diode of the opto-isolator lights an indication of a small value of the output current.

6. A coupling according to claim 5, characterized in that the coupling is part of the secondary side of the switched-mode power supply, which secondary side includes in series connection the current measurement resistor, a secondary coil and a rectifier diode, whereby said bias voltage coupling is connected on one hand to the terminal of the secondary coil which connects to the rectifier diode, and on the other hand to the first end of the current measurement resistor, and said input coupling connects to the second end of the current measurement resistor.

7. A coupling according to claim 6, characterized in that said bias voltage coupling comprises:

between the cathode of the light-emitting diode of the opto-isolator and the secondary coil, connected in series: a first diode and a resistor, of which the cathode of said first diode is connected to the secondary coil and the anode is connected to said resistor, and between a point between the cathode of the light-emitting diode of the opto-isolator and said resistor and the end of the current measurement resistor not connected to the secondary coil, connected in parallel:

a capacitor and connected in series and with similar orientation, a second diode and a third diode, in which the anode of the second diode is connected to the current measurement resistor, and the cathode of the third diode is connected to a point between said series connection and the cathode of the light-emitting diode of the opto-isolator.

* * * * *

UNITED STATES PATENT AND TRADEMARK OFFICE
CERTIFICATE OF CORRECTION

PATENT NO : 5,949,661
DATED : September 7, 1999
INVENTOR(S): Minkkinen

It is certified that error appears in the above-identified patent and that said Letters Patent is hereby corrected as shown below:

At column 6, line 49, --a-- should be inserted before "voltage".

At column 6, line 59, --(24)-- should be inserted after "coupling".

Signed and Sealed this

Sixth Day of June, 2000

Q. TODD DICKINSON

*Attest:*

*Attesting Officer*   *Director of Patents and Trademarks*